United States Patent [19]

Park et al.

[11] Patent Number: 4,925,234

[45] Date of Patent: May 15, 1990

[54] LENGTH ADJUSTABLE, TRUNK STOWABLE PROTECTIVE CAR COVER APPARATUS

[76] Inventors: Woo Park, #128 Inway Village Apartments, 6613 S. Hulen, Fort Worth, Tex. 76133; Kirk M. Mullenax, 1130 Bear Creek Pkwy., Apt. 190 704, Euless, Tex. 76039

[21] Appl. No.: 272,118

[22] Filed: Nov. 16, 1988

[51] Int. Cl.$^5$ ............................................. B60J 11/00
[52] U.S. Cl. ...................................... 296/136; 135/88
[58] Field of Search .................. 135/88, 115; 296/136, 296/100, 99.1; 160/19

[56] References Cited

U.S. PATENT DOCUMENTS

| | | | |
|---|---|---|---|
| 1,918,423 | 7/1933 | Persinger | 160/24 |
| 3,222,102 | 12/1965 | Lucas | 296/136 |
| 3,785,697 | 1/1974 | Dabbs | 296/136 |
| 3,992,053 | 11/1976 | Hrytzak et al. | 296/136 |
| 4,432,581 | 2/1984 | Guma | 296/136 |
| 4,519,644 | 5/1985 | Song | 296/136 |
| 4,596,418 | 6/1986 | Koh | 296/136 |
| 4,657,298 | 4/1987 | Yong | 296/136 |
| 4,718,711 | 1/1988 | Rabbit | 296/136 |
| 4,720,135 | 1/1988 | Farina | 296/136 |
| 4,727,898 | 3/1988 | Guma | 135/87 |
| 4,732,421 | 3/1988 | Ross et al. | 296/136 |
| 4,825,889 | 5/1989 | Monteith | 296/136 |

FOREIGN PATENT DOCUMENTS

| | | |
|---|---|---|
| 2362626 | 12/1973 | Fed. Rep. of Germany . |
| 12433 | 1/1986 | Japan .................................. 296/136 |

Primary Examiner—Charles A. Marmor
Assistant Examiner—Michael Mar
Attorney, Agent, or Firm—Hubbard, Thurman, Turner, Tucker & Harris

[57] ABSTRACT

A length adjustable, trunk stowable protective car cover device is formed from an elongated sheet of flexible weatherproof material having a front end portion releasably connectable to the front end of an automobile, a longitudinally intermediate portion adapted to overlie and shield essentially the entire upper side surface of the automobile, and a rear end portion adapted to extend into the trunk between the rear trunk lid edge and the opposing trunk wall portion which it closes against. Closure of the trunk thus clamps a back end of the cover sheet in place to firmly anchor the cover sheet in place in its operative position. An elongated longitudinal slot in the rear end portion of the cover sheet permits the hook portion of the trunk latch to extend through the cover sheet to permit unimpeded locking and unlocking of the trunk. A fastening structure is provided to adjustable secure the rear end portion of the cover sheet within the trunk in a manner permitting selective variation in the effective covering length of the sheet. The sheet may be conveniently stowed in a longitudinally folded orientation within the trunk and then unfolded over the top of the automobile. To facilitate such folding and unfolding, a grab bar is transversely secured to the front end of the sheet and a spaced series of transverse stays are suitably secured to a longitudinally intermediate portion thereof.

27 Claims, 4 Drawing Sheets

LENGTH ADJUSTABLE, TRUNK STOWABLE PROTECTIVE CAR COVER APPARATUS

BACKGROUND OF THE INVENTION

The present invention relates generally to portable protective car covers and, in a preferred embodiment thereof, more particularly provides an elongated, flexible car cover which is adjustably secured at its rear end to an interior surface of the car trunk, and may be conveniently stored in a folded orientation therein and rapidly unfolded and removably secured at its front end to the front end of the car to thereby cover and protect essentially the entire upper side surface portion of the car.

Flexible car covers have become very popular automotive accessories and are used to protect a parked car's finish from deterioration caused by harsh sunlight, dust, snow, rain, tree sap, bird droppings and the like. Car covers of this type are typically available in a wide variety of shapes and configurations ranging from covers which drape the entire car to partial covers which extend only over the most vulnerable top section of the car (i.e., the hood, roof, windshields and trunk deck).

Perhaps the most common variety of car covers are those which may be folded and carried in the trunk and then removed from the trunk, appropriately draped over the car and secured thereto by appropriate tiedown means. While conceptually simple, and quite effective from a car finish—protecting standpoint, conventional car covers of this general type have several well-known limitations and disadvantages.

For example, they can be rather awkward and difficult, and thus fairly time-consuming, for a single person to install and remove. Additionally, unless the cover is custom designed to precisely fit the contour of the particular car, the cover is often considerably oversized and tends to billow and flap in a stiff breeze despite the use of tie-down straps or the like. Moreover, car covers of this type, when in place over the car exterior, may be very easily and rapidly stolen.

One proposed solution to these problems has been to store the flexible cover on a wind-up roll, of one sort or another, which is externally secured to the front or rear end of the car. From its rolled-up, stored position the flexible car cover can simply be unrolled toward the opposite end of the car and operatively secured over the car. Representative examples of this "roll-up" external cover scheme may be found in U.S. Pat. No. 1,918,423 to Persinger; German patent 2,362,626 to Bergor; U.S. Pat. No. 3,222,102 to Lucas; U.S. Pat. No. 3,992,053 to Hrytzak et al; U.S. Pat. No. 4,432,581 to Guma; U.S. Pat. No. 4,732,421 to Ross et al. A somewhat similar external cover storage concept may be found in U.S. Pat. No. 4,519,644 to Song, which discloses a framed, fold-out car cover housed in an external storage container secured to the rear bumper.

While these conventional approaches are designed to facilitate the more rapid and easier covering and uncovering of the parked car, they clearly build in other problems, limitations and disadvantages. For example, the external mounting of a relatively large cover storage container on the front bumper, the rear bumper, or the trunk lid does little to enhance the overall appearance of the car. Moreover, the addition of a roller structure or other storage container adds to the cost and complexity of the cover system and requires special mounting hardware. Further, since the cover system is always positioned on the exterior of the car, the possibility of theft is further increased.

A modified version of this "roll-up" cover storage scheme is shown in U.S. Pat. No. 4,657,298 to Yong O. The flexible car cover in Yong O is stored within a roller housing secured within the trunk, the cover passing upwardly through the gap between the front edge of the trunk lid and the body of the car. In addition to the added expense of the roller structure, its housing, and the necessary mounting hardware, this car cover system undesirably leaves the entire rear end of the car exposed to the elements.

Another variation on this "roll-up" storage theme may be found in U.S. Pat. No. 4,718,711 to Rabbit in which the flexible car cover is stored on a double roller structure secured to the interior trunk hinges by elastic shock cords. When the cover is rolled onto the front storage roller both rollers may be stored in the trunk. This cover device, like the other discussed above, entails the additional expense of providing the roller structures and the special mounting hardware.

Moreover, like most of the conventional cover structures discussed herein, its flexible sheet, when in its operative position covers the external trunk lock typically positioned in the center of the downturned rear end of the trunk lid. It is thus difficult to externally unlock the trunk without at least partially loosening the operatively positioned flexible cover.

In view of the foregoing, it is an object of the present invention to provide flexible protective car cover apparatus which eliminates or minimizes above-mentioned and other problems, limitations and disadvantages typically associated with conventional flexible car cover systems.

SUMMARY OF THE INVENTION

In carrying out principles of the present invention, in accordance with a preferred embodiment thereof, length adjustable, trunk stowable protective car cover apparatus is provided for extending over and shielding essentially the entire upper side surface portion of an automobile including its hood, roof, front and rear windshields and its trunk. The trunk of the automobile, as is customary, has a front-hinged lid with a rear edge portion that closes against a facing rear wall surface portion of the trunk. Cooperating, interengageable latch structures are centrally mounted on these facing trunk portions for holding the trunk lid closed, and a key-receiving locking member is externally mounted on the trunk adjacent its latch structure.

The protective car cover apparatus comprises an elongated, generally rectangular car cover member formed from a sheet of flexible weatherproof material and having an elasticized front end portion removably securable to the front end of the automobile, a longitudinally intermediate portion adapted to extend over the upper side surface portion of the automobile, and a rear end portion which is extendable into the trunk through its facing trunk lid and trunk wall surfaces. Thus, when the trunk is closed a rear longitudinal section of the cover member is clamped between such surfaces to thereby anchor the rear end of the cover member when it is in its operative position.

To permit operation of the trunk latch with the longitudinal cover member section clamped between the facing trunk surfaces, an elongated, longitudinally extending, laterally centered slot is formed through the rear end of the cover member to define a cover member opening through which the trunk latch structures may be interengaged when the cover member is in its operative position, at least a portion of the slot extending externally along the trunk lid to conveniently expose its key-receiving lock member.

The effective covering length of the cover member, and the overall longitudinal "tightness" thereof, may be selectively and quite easily varied simply by altering the location of the longitudinal cover member section which is clamped between the facing rear trunk lid and wall surfaces—i.e., by varying the length of the cover member rear end portion retained within the trunk when its lid is closed and the front end of the cover member is operatively secured to the front end of the automobile. This effective covering length adjustment feature advantageously renders the car cover member suitable for use on automobiles of various sizes, and it can thus readily be transferred from car to car.

The rapid adjustment of the effective covering length of the car cover member is facilitated by a unique rear end fastening system associated therewith which, for a given automobile, permits the adjustment to be made once and then automatically maintained thereafter. In a preferred embodiment thereof the fastening system comprises first fastening means secured to and extending horizontally along an interior surface portion of the lower rear end wall of the trunk, and second fastening means which extend longitudinally along the cover member rear end portion on opposite sides of the elongated slot formed therethrough. The second fastening means are releasably attachable, along a selectively variable longitudinal location thereon, to the first fastening means. Accordingly, by varying the longitudinal connection location on the second fastening means the effective covering length of the cover member can quickly be altered if desired.

In the preferred embodiment of the car cover apparatus a grab bar is transversely secured to the front end portion of the flexible cover member, inwardly of the front cover member edge, and a spaced series of transverse reinforcing stays are secured to a longitudinally intermediate portion of the cover member. During trunk stowage thereof, the cover member is longitudinally folded, accordion-like, at its reinforcing stays to form a compact folded bundle that occupies a relatively small portion of the trunk. The grab bar rests atop the bundle, and the preadjusted fastening system anchors the rear end portion of the cover member to a rear interior surface of the trunk.

To very quickly cover and protect the upper side surface portion of the automobile the trunk is opened, the cover member bundle is lifted out of the trunk, and the trunk lid is closed. From one side of the automobile, the grab bar is then pulled forwardly over its top, causing the bundle to unfold, until the grab bar is positioned at the front end of the automobile. The elasticized front end portion of the cover member is then stretched and positioned under the front end of the automobile to complete the covering task.

The uncovering of the automobile is just as easy. The front end portion of the cover member is simply disengaged from the automobile and the grab bar and the reinforcing stays are successively grasped, while walking rearwardly along one side of the automobile, so that when the rear of the automobile is reached the folded cover member bundle is automatically reformed. The trunk is then opened, the bundle dropped into the trunk, and the trunk closed.

In summary, the protective car cover apparatus of the present invention is of a very simple and light weight construction, is relatively inexpensive to manufacture, and is quite easy to use. It permits one person to very rapidly cover and uncover the upper side surface of his automobile, and its unique adjustment feature permits the car cover member, from a length standpoint, to be "custom tailored" to a variety of cars. Additionally, the trunk-clamping of a rear end portion of the cover member provides a desirable degree of theft deterrence. The entire apparatus, despite its length adjustment capabilities, is compactly stowable entirely within the trunk, thereby eliminating the necessity for bulky and unattractive externally mounted rollers and/or stowage containers. Moreover, no special hardware is required to adjustably fasten the rear cover member end portion within the trunk—the previously mentioned first and second fastening means may be inexpensively fashioned from mating hook and pile fastening strips.

DETAILED DESCRIPTION

Figure 1:
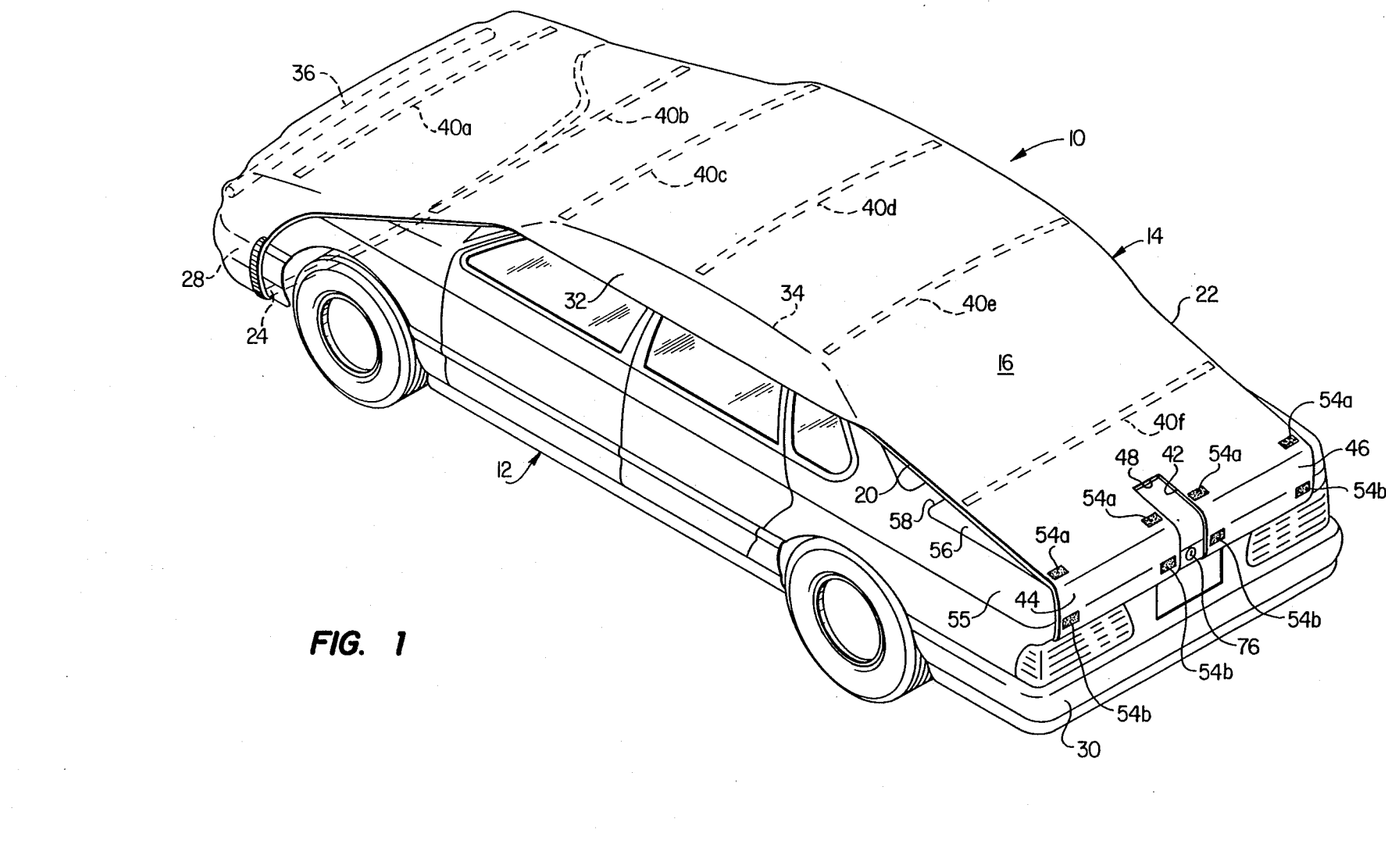
FIG. 1 is a perspective view of a representative automobile to which a length adjustable, trunk stowable protective car cover of the present invention is secured in its operative position.

Perspectively illustrated in FIG. 1 is a length adjustable, trunk stowable protective car cover apparatus 10 which embodies principles of the present invention and is used to cover and protect essentially the upper side surface portion (comprising the hood, roof, front and rear windshields, and trunk deck) of a representative automobile 12. The car cover apparatus 10 includes an elongated, generally rectangular car cover member 14 formed from a sheet of flexible, weatherproof material and having an outer side surface 16, an inner side surface 18 (FIG. 3), left and right side edges 20 and 22, an elasticized front end edge 24, and a rear end edge 26. With the apparatus 10 in its operative, covering position depicted in FIG. 1, the cover sheet 14 extends longitudinally over the upper side surface portion of the automobile 12 with front and rear end portions of the cover sheet 14 being respectively secured to front and rear end portions 28, 30 of the automobile in a manner subsequently described. At least a longitudinally central portion of the cover member 14 is dimensioned to be somewhat wider than the upper side surface portion of the automobile so that when the cover member is in its operative position, side edge portions 32 thereof extend downwardly over opposite side surfaces of the roof area 34 of the automobile 12, thereby adding lateral stability to the cover member in its operative position.

For purposes later described, an elongated grab bar member 36 is suitably secured to a front end portion of the cover member 14 inwardly adjacent the elasticized front end edge 24 thereof. The grab bar 36 extends transversely to the cover member 14 and is attached to its outer side surface 16 by means of a suitable fabric strip 38 extending over the grab bar and sewn onto the outer side surface 16. A variety of alternate attachment methods could be used if desired. Also secured to the outer side surface 16 of the cover member 14 in a similar fashion are a series of transversely extending reinforcing stay members $40_a$–$40_f$ which are positioned in a mutually spaced relationship along a longitudinally intermediate portion of the cover member. Each of these reinforcing stay members is laterally centered along its portion of the cover member 14 and has a length generally equal to the width of the upper side surface portion of the automobile 12. As will be subsequently described, the grab bar member 36 and the stays $40_a$–$40_f$ facilitate the installation and removal of the cover member 14 and also function to reinforce it in its operative position.

Figure 3:
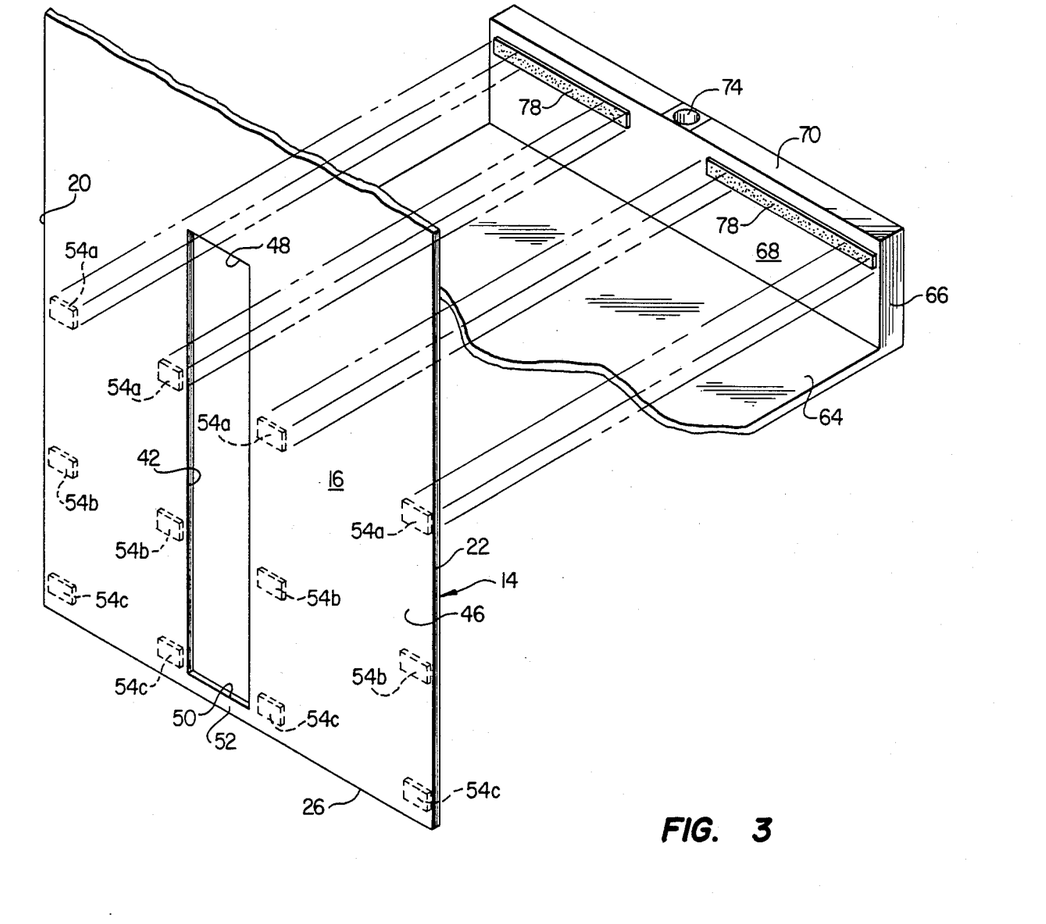
FIG. 3 is an exploded, fragmentary perspective view of a rear end portion of the car cover, and a lower rear end portion of the automobile's trunk, and illustrates a representative adjustable fastening structure used to removably secure a rear end portion of the car cover to an interior surface of the trunk.

Referring now to FIG. 3, a rear end portion of the cover member 14 has formed therethrough an elongated, generally rectangular opening or slot 42 which is laterally centered in such rear end portion between opposite side portions 44 and 46 thereof. As viewed in FIG. 3, the slot 42 has an upper end 48 and a lower end 50. The lower slot end 50 is positioned slightly inwardly of the rear end edge 26 of the cover member 14 to form therewith a small strip 52 which interconnects the rear ends of the opposite side portions 44 and 46.

Suitably secured to the outer side surface 16 of each cover member rear end side portion 44 and 46 are two longitudinally extending rows of spaced apart fastening members $54_a$–$54_c$ formed from conventional fastening hook material used in hook-and-pile fastening systems. As illustrated, one of the longitudinally extending fastening member rows on each side portion 44, 46 is laterally adjacent one of the cover member side edges, while the other longitudinal row is laterally adjacent the slot 42. The depicted fastening members also form aligned, laterally extending rows, with the upper lateral row of fastening members $54_a$ being positioned downwardly from the upper end 48 of slot 42, and the lower lateral row of fastening members $54_c$ being adjacent the rear end edge 26 of cover member 14. As will be seen, the illustrated fastening members $54_a$–$54_c$ form a part of a unique effective covering length adjustment structure for the flexible cover member 14.

Referring now to FIGS. 1, 2D, 3 and 4, the automobile 12 is provided, adjacent its rear end 30, with a conventionally configured trunk 55 having a lid 56 which is hinged at its front edge 58 and has a downturned rear edge portion 60 terminating in a lower end edge 62. The trunk 55 also comprises a base section which includes a trunk floor panel 64 and an upwardly projecting rear end wall 66 having an inner side surface 68 and an upper side edge portion 70. In a conventional manner, when the trunk 55 is closed, the rear end edge 62 of the lid 56 closes against the upper side edge 70 of the trunk end wall 66. To releasably hold the trunk lid in its closed position, a laterally centrally positioned latch structure is provided and includes a latch hook member 72 carried by the lid portion 60, and a latch retaining structure 74 positioned centrally along the upper side edge 70 of the rear trunk wall 66. When the latch hook 72 is received and engaged by the latch retaining structure 74, the trunk may be locked using a key-receiving member 76 externally secured to the rear lid portion 60 and laterally aligned with the latch hook member 72.

A second portion of the previously mentioned cover member fastening structure is defined by a pair of elongated strips 78 of fastening pile material (FIG. 3) which are suitably secured to the inner side surface 68 of the rear end wall 66 of the trunk. As illustrated, the strips 78 extend horizontally, and are spaced apart on opposite sides of the latch retaining structure 74.

Figure 2A:
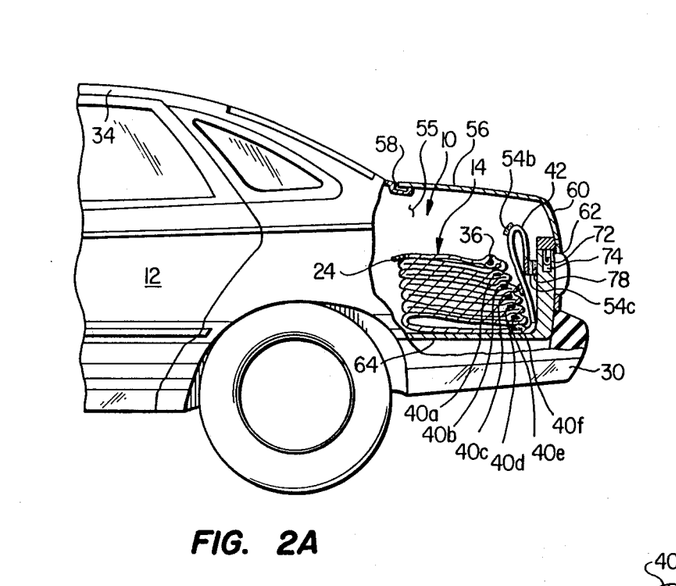
FIGS. 2A–2C are partially cut away side elevational views of the automobile and sequentially illustrate the easy and rapid manner in which the car cover may be moved from its trunk-stowed position (FIG. 2A) to its operative position (FIG. 2C)
Figure 2B:
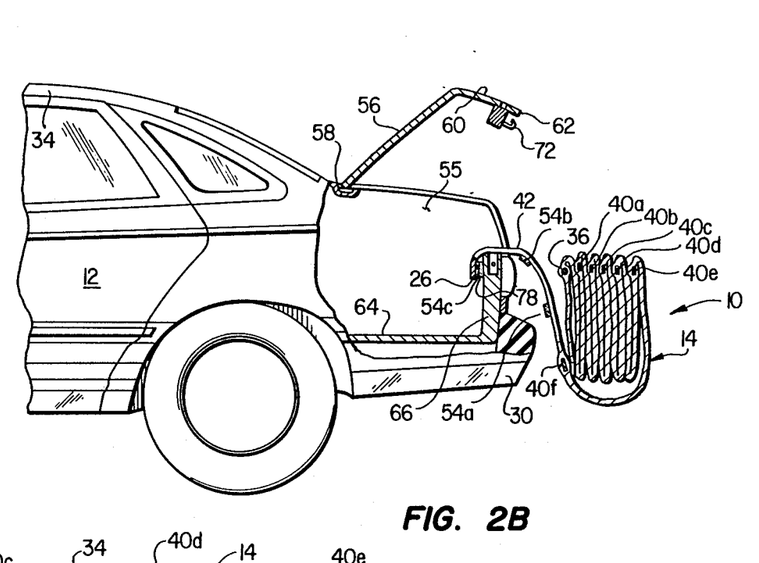

Referring now to FIGS. 2A–2C, the car cover apparatus 10 may be conveniently stowed within the closed trunk 55 (FIG. 2A) in the form of a longitudinally folded bundle in which the cover member 14 is folded at the reinforcing stays $40_a$–$40_f$ with the grab bar 36 conveniently resting atop the folded bundle. For purposes of illustration, the folded car cover member 14 depicted in FIG. 2A is illustrated in its longest adjusted position, with the hook material fastening strips $54_c$ (FIG. 3) being secured to the fastening pile material strips 78 connected to the inner side surface 68 of the rear trunk wall 66. To move the car cover apparatus 10 to its operative position depicted in FIG. 1, the trunk lid 56 is opened (FIG. 2B) and the folded bundle is lifted rearwardly out of the opened trunk 55. With the bundle lifted out of the trunk in this manner, the fastening strips $54_c$ hold a rear end portion of the cover sheet 14 in a position in which it laterally extends along the width of the trunk interior with the car cover member slot 42 being aligned with the trunk latch structures 72, 74.

Figure 2C:
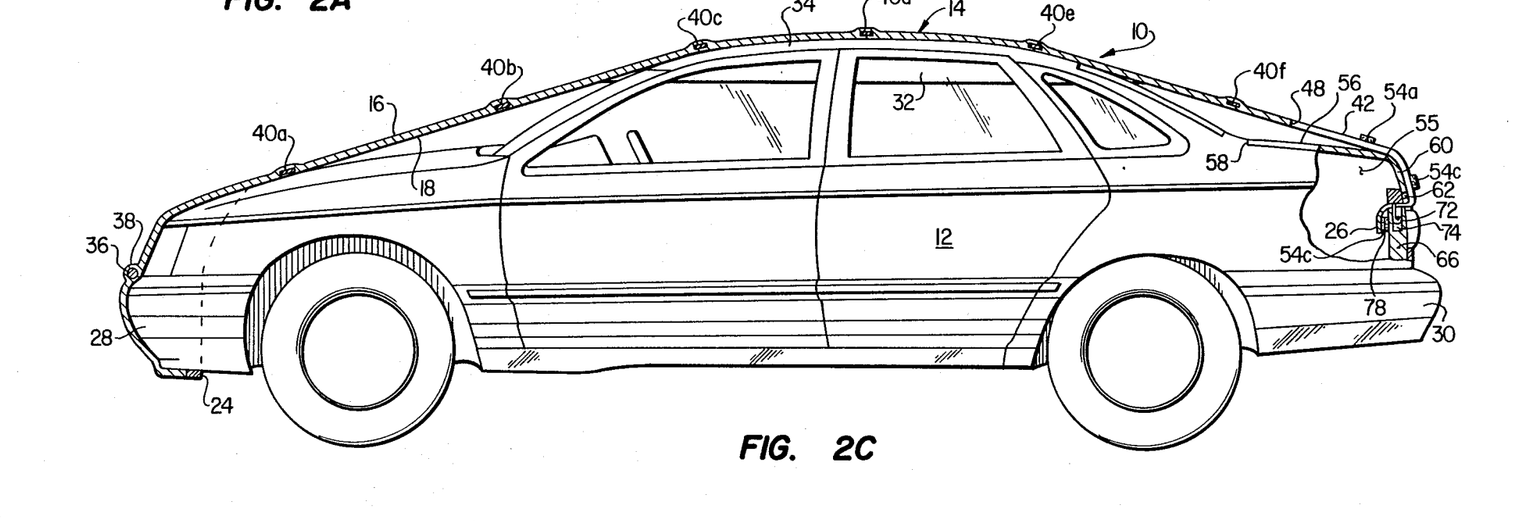

The trunk lid 56 is then closed, so that the trunk latch elements 72, 74 engage through the slot 42, and a longitudinally intermediate section of the rear end portion of the cover sheet 14 is clamped between the trunk lid edge 62 and the upper side edge portion 70 of the trunk wall 66. The removed cover sheet bundle may then be conveniently placed atop the closed trunk lid 56 while the car owner grasps the grab bar 36 and walks forwardly along one side of the automobile to unfold the bundle over its top until the grab bar 36 is positioned adjacent the front end of the automobile 12 as illustrated in FIG. 2C. The elasticized front end edge 24 of the cover sheet 14 is then simply hooked under the front end of the automobile to complete the car covering process. In its operative position as depicted in FIG. 2C, the car cover member 14 is anchored to the automobile 12 at both the front and rear ends of the car cover member. The grab bar 36, and the transversely extending reinforcing stays $40_a$–$40_f$ function to inhibit lateral twisting of the installed car cover member 14.

Figure 2D:
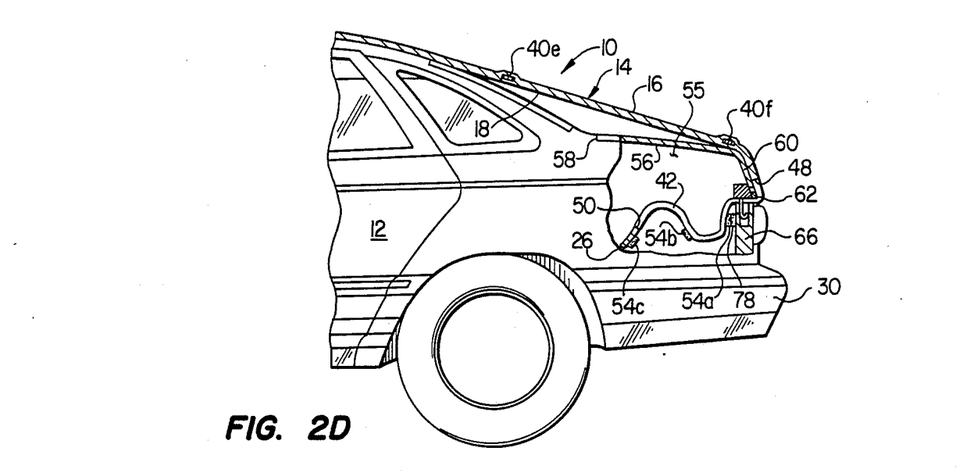
FIG. 2D is a partially cut away side elevational view of a rear portion of the automobile and illustrates the length adjustment capabilities of the car cover.

As can be seen in FIG. 1, with the car cover member 14 in this operative position, the car cover member slot 42 extends upwardly along the outer surface of the trunk lid 56 to conveniently expose the key lock member 76, and the fastening hook material strips $54_a$ and $54_b$ on the outer side surface 16 of the cover member 14 are positioned externally of the trunk 55. To longitudinally shorten the effective covering length of the cover member 14, all that is necessary is simply to secure one of the other lateral rows of fastening members 54$_a$, 54$_b$ to the fastening strips 78 positioned within the trunk. For example, as illustrated in FIG. 2D, to move the car cover member 14 to its shortest effective covering length, the fastening strips 54$_a$ would be secured to the fastening strips 78 prior to closing the trunk lid 56.

Figure 4:
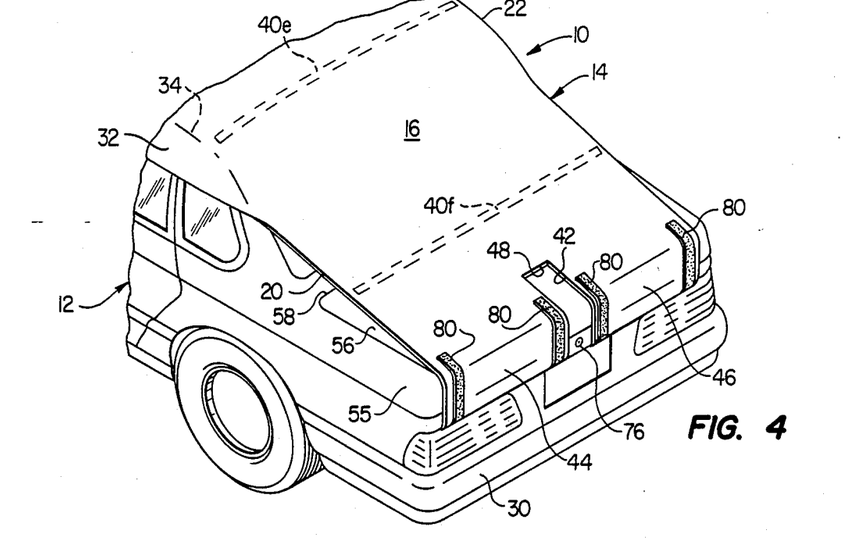
FIG. 4 is a perspective view of a rear end portion of the automobile of FIG. 1 and a representative modified version of the rear car cover end portion fastening structure.

The use of the three rows of cover member fastening strips 54$_a$–54$_c$ just described gives the cover member an incremental length adjustment consisting of a short length, and intermediate length and a long length. If a more finely graduated length adjustment is desired, the discrete rows of fastening member strips 54$_a$–54$_c$ may be replaced with four longitudinally extending fastening hook material strips 80 as depicted in FIG. 4. By using these continuous strips 80 an even more precise effective covering length adjustment may be achieved simply by removably attaching selectively variable longitudinal portions of the strips 80 to the fastening pile material strips 78 positioned in a fixed location within the interior of the trunk 55.

Figure 5A:
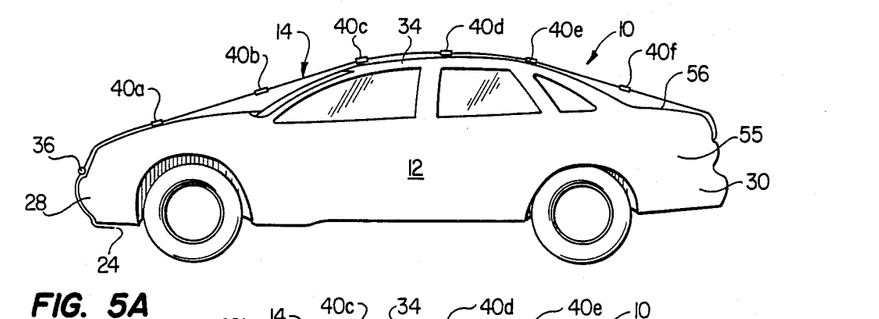
FIGS. 5A–5C are schematic side elevational views of the automobile and the car cover, and sequentially illustrate the easy and rapid manner in which the car cover may be re-folded from its operative position (FIG. 5A) for stowage in the trunk as depicted in FIG. 2A.
Figure 5B:
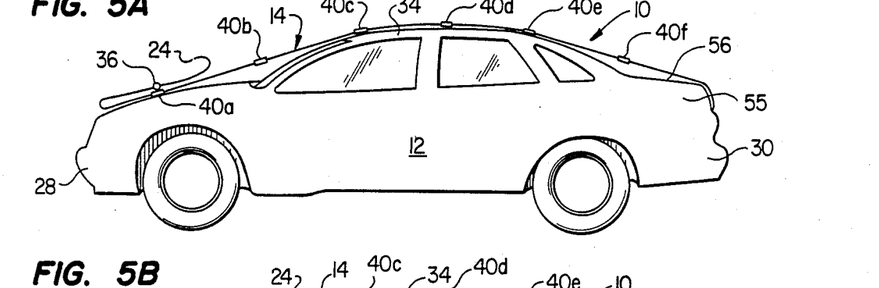
Figure 5C:
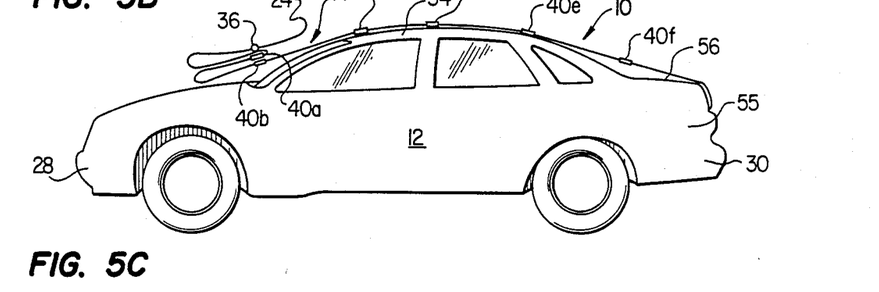

It can be seen from the foregoing that the car cover apparatus 10 may be very easily and rapidly installed over the upper side surface portion of the automobile 12 by a single person. The apparatus is just as easily be removed and re-stowed within the trunk 55, the removal and stowage operation being schematically depicted in FIGS. 5A-5C. To remove the car cover member 14 from atop the automobile 12, the elasticized front edge portion 24 of the car cover member 14 is simply unhooked from the front end of the automobile 12, and the grab bar 36 grasped by the car owner. Then, while standing on one side of the automobile 12, the car owner places the grab bar 36 atop the first reinforcing stay 40$_a$ (FIG. 5B) and then places the grab bar 36 and the stay 40$_a$ atop the second stay 40$_b$ (FIG. 5C) to start the refolding process. The remaining stays 40$_c$–40$_f$ are then sequentially grasped while the owner moves rearwardly along one side of the automobile 12 to form the folded and bundled car cover member 14 as illustrated in FIG. 2B. The trunk lid 56 is then opened, the folded bundle is dropped into the trunk 55 as illustrated in FIG. 2A, and the trunk lid 56 is closed.

The foregoing detailed description is to be clearly understood as being given by way of illustration and example only, the spirit and scope of the present invention being limited solely by the appended claims.

What is claimed is:

1. For use with an automobile having a front end; an upper side portion extending along the length of said automobile; a trunk having a base section with a rear end portion, and a front-hinged lid having a rear edge portion adapted to close against said rear end portion of said base section; and cooperating, interengageable trunk latch means, positioned on said rear end portion of said base section and said rear edge portion of said lid, for locking said trunk, length adjustable, trunk stowable protective car cover apparatus comprising:

an elongated flexible car cover member formed from a sheet of foldable weatherproof material and sized to extend longitudinally along and cover said upper side portion of said automobile, said car cover member having an outer side surface, an inner side surface, opposite side edge poritons, a front end portion, a rear end portion, and an elongated, longitudinally extending opening formed through and along said rear end portion of said car cover member and positioned between opposite side portions thereof, said car cover member being stowable in a longitudinally folded orientation within said trunk;

adjustable means, including fastening means carried by said rear end portion for movement therewith, for directly securing a selectively variable portion of said rear end portion of said car cover member to an interior portion of the trunk when the folded, remaining effective covering length of said car cover member is removed from the opened trunk, the effective covering length of said car cover member being selectively variable by using said adjustable means to selectively vary the retained length of said rear end portion of said car cover member, said adjustable means being further operative to extend the retained car cover member length laterally across the width of the trunk interior and to laterally align said car cover member opening with said cooperating trunk latch means in a manner such that after the folded effective covering length of said car cover member is removed from the opened trunk, said upper side portion of said automobile may be rapidly and easily covered by:

closing said trunk lid to cause interengagement of said cooperating trunk latch means through said car cover member opening, and to lockingly clamp a longitudinal section of said rear end portion of said car cover member between said rear edge portion of said trunk lid and said rear end portion of said base section of said trunk, and unfolding the effective covering length of said car cover member over said upper side portion of said automobile to position said front end portion of said car cover member adjacent said front end of said automobile; and attachment means for removably attaching said front end portion of said car cover member to said front end of said automobile.

2. The apparatus of claim 1 wherein:

said attachment means include an elasticized front end edge portion of said car cover member adapted to be positioned under the front end of the automobile.

3. The apparatus of claim 1 further comprising:

a spaced series of relatively rigid members transversely secured to said cover member along the longitudinal portion thereof adapted to overlie the upper side surface portion of the automobile.

4. The apparatus of claim 3 wherein said relatively rigid members include:

a grab bar positioned longitudinally inwardly of the front end edge of said cover member, and a spaced series of reinforcing stay members positioned longitudinally inwardly of said grab bar member.

5. The apparatus of claim 1 wherein:

a longitudinally outer end of said car cover member opening is spaced inwardly from the rear end edge of said car cover member.

6. For use with an automobile having a front end; an upper side portion extending along the length of said automobile; a trunk having a base section with a rear end portion, and a front-hinged lid having a rear edge portion adapted to close against said rear end portion of said base section; and cooperating, interengageable trunk latch means, positioned on said rear end portion of said base section; and said rear edge portion of said lid, for locking said trunk, length adjustable, trunk stowable protective car cover apparatus comprising:

an elongated flexible car cover member formed from a sheet of foldable weatherproof material and sized to extend longitudinally along and cover said upper side portion of said automobile, said car cover member having an outer side surface, an inner side surface, opposite side edge portions, a front end portion, a rear end portion, and an elongated, longitudinally extending opening formed through and along said rear end portion of said car cover member and positioned between opposite side portions thereof, said car cover member being stowable in a longitudinally folded orientation within said trunk;

adjustable means for holding a retained, selectively variable outer longitudinal length of said rear end portion of said car cover member within said trunk when the folded, remaining effective covering length of said car cover member is removed from the opened trunk, the effective covering length of said car cover member being selectively variable by using said adjustable means to selectively vary the retained length of said rear end portion of said car cover member, said adjustable means being further operative to extend the retained car cover member length laterally across the width of the trunk interior and to laterally align said car cover member opening with said cooperating trunk latch means in a manner such that after the folded effective covering length of said car cover member is removed from the opened trunk, said upper side portion of said automobile may be rapidly and easily covered by:

closing said trunk lid to cause interengagement of said cooperating trunk latch means through said car cover member opening, and to lockingly clamp a longitudinal section of said rear end portion of said car cover member between said rear edge portion of said trunk lid and said rear end portion of said base section of said trunk, and unfolding the effective covering length of said car cover member over said upper side portion of said automobile to position said front end portion of said car cover member adjacent said front end of said automobile; and attachment means for removably attaching said front end portion of said car cover member to said front end of said automobile;

wherein said adjustable means include:

first fastening means connectable to an interior surface portion of the trunk, and second fastening means, secured to and extending longitudinally along said opposite side poritons of said rear end portion of said cover member, selectively variable longitudinal portions of said second fastening means being releasably attachable to said first fastening means.

7. The apparatus of claim 6 wherein:
said second fastening means extend along a plurality of laterally spaced locations on each of said opposite side portions of said rear end portion of said car cover member.

8. The apparatus of claim 7 wherein:
one of said first and second fastening means is formed from a fastening pile material, and the other of said first and second fastening means is formed from a fastening hook material.

9. The apparatus of claim 6 wherein:
said attachment means include an elasticized front end portion of said car cover member adapted to be positioned under the front end of the automobile.

10. The apparatus of claim 6 further comprising:
a spaced series of relatively rigid members transversely secured to said cover member along the longitudinal portion thereof adapted to overlie the upper side surface portion of the automobile.

11. The apparatus of claim 10 wherein said relatively rigid members include:
a grab bar positioned longitudinally inwardly of the front end edge of said cover member, and
a spaced series of reinforcing stay members positioned longitudinally inwardly of said grab bar member.

12. The apparatus of claim 6 wherein:
a longitudinally outer end of said car cover member opening is spaced inwardly from the rear end edge of said car cover member.

13. Foldable protective car cover apparatus stowable entirely within the trunk of an automobile when not in use, and unfoldable from said trunk to cover essentially the entire upper side surface of the automobile, said trunk having a lid with a first rear end portion closable against a second rear end portion of the automobile, and cooperating, interengageable latch means on said first and second rear end poritons for releasably closing said trunk, aid apparatus comprising:

an elongated flexible car cover member formed from a sheet of foldable weatherproof material sized to longitudinally extend along and cover said upper side portion of the automobile when said car cover member is in its operative position, and said car cover member having:

a length appreciably longer than the horizontal length of said upper side surface of the automobile, a front end portion positionable adjacent the front end of the automobile and removably connectable thereto, a rear end portion having an outer longitudinal section positionable within the trunk of the automobile, an intermediate longitudinal section positionable to be clamped between said first and second rear trunk end portions when the trunk is closed, and an inner longitudinal section positionable to extend exteriorly along a portion of the closed trunk lid when said front end portion of said car cover member is operatively positioned adjacent the front end of the automobile, and an elongated, longitudinally extending opening formed through said outer, intermediate and inner longitudinal sections of said rear end portion of said car cover member between opposite side portions thereof; and adjustable means, including fastening means carried by said car cover member for movement therewith, for securing a selectively variable portion of said outer longitudinal section of said rear end portion of said car cover member to an interior surface portion of the trunk of the automobile in a manner permitting the selective variance of the longitudinal position of said intermediate longitudinal section to thereby selectively vary the overall length of said car cover member available to cover and protect said upper side surface of the automobile, said adjustable means being further operative to extend a portion of said outer longitudinal section of said rear end portion of said car cover member laterally across the width of the trunk interior and to laterally align said car cover member opening with said trunk latch means in a manner such that when said car cover member is in said operative position thereof, with the trunk closed, said cooperating trunk latch means are interengaged through said car cover member opening.

14. The apparatus of claim 13 further comprising:
a spaced series of relatively rigid members transversely secured to said cover member along the longitudinal portion thereof adapted to overlie the upper side surface portion of the automobile.

15. The apparatus of claim 14 wherein said relatively rigid members include:
a grab bar positioned longitudinally inwardly of the front end edge of said cover member, and
a spaced series of reinforcing stay members positioned longitudinally inwardly of said grab bar member.

16. Foldable protective car cover apparatus stowable entirely within the trunk of an automobile when not in use, and unfoldable from said trunk to cover essentially the entire upper side surface of the automobile, said trunk having a lid with a first rear end portion closable against a second rear end portion of the automobile, and cooperating, interengageable latch means on said first and second rear end poritons for releasably closing said trunk, said apparatus comprising:
an elongated flexible car cover member formed from a sheet of foldable weatherproof material sized to longitudinally extend along and cover said upper side portion of the automobile when said car cover member is in its operative position, said car cover member having:
a length appreciably longer than the horizontal length of said upper side surface of the automobile,
a front end portion positionable adjacent the front end of the automobile and removably connectable thereto,
a rear end portion having an outer longitudinal section positionable within the trunk of the automobile, an intermediate longitudinal section positionable to be clamped between said first and second rear trunk end poritons when the trunk is closed, and an inner longitudinal section positionable to extend exteriorly along a portion of the closed trunk lid when said front end portion of said car cover member is operatively positioned adjacent the front end of the automobile, and
an elongated, longitudinally extending opening formed through said outer, intermediate and inner longitudinal sections of said rear end portion of said car cover member between opposite side poritons thereof; and
adjustable means for securing said outer longitudinal section of said drear end portion of said car cover member within the trunk of the automobile in a manner permitting the selective variance of the longitudinal position of said intermediate longitudinal section to thereby selectively vary the overall length of said car cover member available to cover and protect said upper side surface of the automobile, said adjustable means being further operative to extend a portion of said outer longitudinal section of said rear end portion of said car cover member laterally across the width of the trunk interior and to laterally align said car cover member opening with said trunk latch means in a manner such that when said car cover member is in said operative position thereof, with the trunk closed, said cooperating trunk latch means are interengaged through said car cover member opening;
wherein said adjustable means include:
first fastening means connectable to an interior surface portion of said trunk, and
second fastening means, secured to and extending longitudinally along said opposite side poritons of said rear end portion of said cover member, said first and second fastening means being releasably interengageable along selectively variable longitudinal poritons of said second fastening means.

17. The apparatus of claim 16 wherein:
one of said first and second fastening means is formed from a fastening pile material, and the other of said first and second fastening means is formed from a fastening hook material.

18. The apparatus of claim 16 further comprising:
a spaced series of relatively rigid members transversely secured to said cover member along the longitudinal portion thereof adapted to overlie the upper side surface portion of the automobile.

19. The apparatus of claim 18 wherein said relatively rigid members include:
a grab bar positioned longitudinally inwardly of the front end edge of said cover member, and
a spaced series of reinforcing stay members positioned longitudinally inwardly of said grab bar member.

20. Portable protective car cover apparatus comprising:
an elongated cover sheet of flexible, weatherproof material sized to longitudinally extend along and shield essentially the entire upper side surface portion of an automobile when in a use position in which a front end section of the cover sheet is positioned adjacent the front end of the automobile, at least a portion of a rear end section of the cover sheet is positioned within the trunk, and a longitudinal section of the cover sheet immediately adjacent said portion of said rear end section thereof is clamped between a rear edge portion of the trunk lid and the opposing trunk wall portion which such rear trunk lid edge portion engages when the trunk lid is held closed by cooperating, interengageable latch structures carried by said rear trunk lid edge portion and said opposing trunk wall portion, said cover sheet having an elongated, longitudinally extending opening formed through said rear end section and laterally positioned so that said latch structures are interengageable therethrough, whereby the length of said rear end portion positioned within the trunk may be selectively varied, without interfering with the operative interengagement of said latch structures, to thereby selectively vary the effective covering length of said car cover members;
attachment means for removably attaching said front end section of said cover sheet to the front end of the automobile; and
adjustable fastening means carried by a portion of said rear end section for removably attaching a selectively variable longitudinal portion of the rear end section of said cover sheet essentially directly to an interior surface portion of the trunk to thereby selectively vary the longitudinal position of said longitudinal section of said cover sheet.

21. The apparatus of claim 20 further comprising:
a spaced series of relatively rigid members transversely secured to said cover member along the longitudinal portion thereof adapted to overlie the upper side surface portion of the automobile.

22. Portable protective car cover apparatus comprising:
an elongated cover sheet of flexible, weatherproof material sized to longitudinally extend along and shield essentially the entire upper side surface portion of an automobile when in a use position in which a front end section of the cover sheet is positioned adjacent the front end of the automobile, at least a portion of a rear end section of the cover sheet is positioned within the trunk, and a longitudinal section of the cover sheet immediately adjacent said portion of said rear end section thereof is clamped between a rear edge portion of the trunk lid and the opposing trunk wall portion which such rear trunk lid edge portion engages when the trunk lid is held closed by cooperating, interengageable latch structures carried by said rear trunk lid edge portion and said opposing trunk wall portion, said cover sheet having an elongated, longitudinally extending opening formed through said rear end section and laterally positioned so that said latch structures are interengageable therethrough, whereby the length of said rear end portion positioned within the trunk may be selectively varied, without interfering with the operative interengagement of said latch structures, to thereby selectively vary the effective covering length of said car cover members;
attachment means for removably attaching said front end section of said cover sheet to the front end of the automobile; and
means for removably attaching a selectively variable longitudinal portion of the rear end section of said cover sheet to an interior surface portion of the trunk to thereby selectively vary the longitudinal position of said longitudinal section of said cover sheet, wherein said means for removably attaching include:
first fastening means connectable to an interior surface portion of the trunk, and
second fastening means, secured to and extending longitudinally along said opposite side poritons of said rear end portion of said cover member, selectively variable longitudinal portions of said second fastening means being releasably attachable to said first fastening means.

23. The apparatus of claim 22 wherein:
one of said first and second fastening means is formed from a fastening pile material, and the other of said first and second fastening means is formed from a fastening hook material.

24. The apparatus of claim 22 further comprising:
a spaced series of relatively rigid members transversely secured to said cover member along the longitudinal portion thereof adapted to overlie the upper side surface portion of the automobile.

25. For use on an automobile having a front end, an upper side surface extending along essentially the entire length of the automobile, and a trunk having a rearwardly disposed wall portion, a lid having a rear edge portion adapted to close against said wall portion, and cooperating, interengageable latch means on laterally central poritons of said rear edge portion and said wall portion for releasably holding the trunk lid closed, protective car cover apparatus comprising:
an elongated flexible car cover member formed from a sheet of foldable weatherproof material and sized to longitudinally extend over and shield said upper side surface of the automobile, said car cover member having:
a front end portion,
a rear end portion adapted to extend between said rear trunk lid edge portion and said trunk wall portion into said trunk, and
an elongated, longitudinally extending opening formed laterally centrally through said rear end portion of said cover member between opposite side poritons thereof;
attachment means for releasably attaching said front end portion of said cover member to the front end of the automobile;
first fastening means connectable to an interior surface portion of said trunk wall portion; and
second fastening means, secured to and extending longitudinally along said opposite side portions of said rear end portion of said cover member,
said frist and second fastening means being releasably interengageable along selectively variable poritons of said second fastening means to selectively vary the length of said rear end portion of said cover member disposed within said trunk when the balance of said cover member overlies said upper side surface of the automobile, to extend the fastened part of said rear end portion of said cover member laterally across the width of the trunk interior, and to laterally align said cover member opening with said latch means so that they may operatively interengage through said opening regardless of which longitudinal portion of said second fastening means is releasably interengaged with said first fastening means.

26. The apparatus of claim 25 further comprising:
a spaced series of relatively rigid members transversely secured to said cover member along the longitudinal portion thereof adapted to overlie the upper side surface portion of the automobile.

27. The apparatus of claim 26 wherein said relatively rigid members include:
a grab bar positioned longitudinally inwardly of the front end edge of said cover member, and
a spaced series of reinforcing stay members positioned longitudinally inwardly of said grab bar member.

* * * * *